(12) United States Patent
Jurik et al.

(10) Patent No.: US 6,371,519 B1
(45) Date of Patent: Apr. 16, 2002

(54) STEERING SHAFT SUPPORT MECHANISM

(75) Inventors: Mirjana Jurik, Rochester Hills; Rodney L. Eaton, Clarkston; Thomas Dziegielewski, Rochester Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/694,180

(22) Filed: Oct. 23, 2000

(51) Int. Cl.⁷ .................................................. B62D 1/19
(52) U.S. Cl. ......................................... 280/777; 74/492
(58) Field of Search ................................ 280/775, 777; 74/492

(56) References Cited

U.S. PATENT DOCUMENTS

| | | | |
|---|---|---|---|
| 3,470,761 A | | 10/1969 | Okamoto |
| 3,479,902 A | | 11/1969 | Okamoto |
| 3,670,591 A | * | 6/1972 | Milton |
| 3,703,105 A | * | 11/1972 | Milton et al. |
| 3,815,438 A | | 6/1974 | Johnson |
| 3,877,319 A | | 4/1975 | Cooper |
| 3,938,404 A | | 2/1976 | Murase et al. |
| 4,616,522 A | * | 10/1986 | White et al. |
| 5,477,750 A | | 12/1995 | Korzan |
| 5,609,423 A | | 3/1997 | Jurik et al. |
| 5,664,806 A | | 9/1997 | Vortmeyer et al. |
| 5,704,642 A | | 1/1998 | Jurik et al. |
| 5,722,300 A | | 3/1998 | Burkhard et al. |
| 5,755,461 A | | 5/1998 | Halacka et al. |
| 5,758,545 A | | 6/1998 | Fevre et al. |
| 5,797,685 A | | 8/1998 | Jurik et al. |
| 5,979,860 A | | 11/1999 | Jurik et al. |

* cited by examiner

*Primary Examiner*—Paul N. Dickson
(74) *Attorney, Agent, or Firm*—Ralph E. Smith

(57) ABSTRACT

A vehicle steering mechanism can be supported for controlled collapse in crash situations, by constructing the steering shaft support housing as a rigid assembly having a metal die casting and tubular steel shroud as the principal components. The rigid die casting transmits a shock force from the vehicle steering wheel to shearable fasteners that connect the die casting to a mounting structure on the vehicle. Undesired resilience or spring in the steering shaft support mechanism is eliminated, such that the system has a desired predictability in frontal crash situations. The shaft housing deflection is effectively snubbed by a friction ring encircling a lower portion of the tubular steel shroud.

7 Claims, 2 Drawing Sheets

STEERING SHAFT SUPPORT MECHANISM

FIELD OF THE INVENTION

This invention relates to a collapsible energy-absorbing support system for a vehicle steering mechanism.

BACKGROUND OF THE INVENTION

Mechanisms have been devised for allowing vehicle steering wheels to collapse in the event that the driver of the vehicle should forcibly impact the steering wheel during a vehicle crash incident e.g. a front end collision. Such mechanisms are conventionally formed out of stamped metal components suitably welded, or otherwise connected together, to form a deformable support system for the steering shaft and steering wheel.

One problem with such conventional mechanisms is that the stamped components can deflect, or deform, under normal operating loads. In a crash situation the mechanisms can act as a stiff spring so as to delay or prevent collapse of the steering wheel, with the possibility of a momentary oscillating condition tending to prolong human injury. Conventional collapse systems are somewhat unpredictable in crash situations.

SUMMARY OF THE INVENTION

The present invention relates to an energy-absorbing support system for a vehicle steering mechanism, wherein a principal component of the support system is a one-piece rigid metal die casting. In a crash situation, the connection between the die casting and an overhead mounting bracket shears at a predictable shock loading, with minimal time delay in the collapse action. The rigidness of the metal die casting increases the predictability of the response to shock loading. (e.g. during a front-end collision).

In preferred practice of the invention the energy-absorbing support system includes a tubular shaft housing rigidly joined to the lower end of the aforementioned die casting. The tubular shaft housing extends downwardly into a tubular casing carried by a lower mounting bracket. An annular friction ring within the tubular casing exerts a strong frictional force on the outer surface of the tubular shaft housing, so that after release of the die casting from the overhead mounting bracket the shaft support assembly is brought to a controlled stop, without undesired rebound. The friction ring rigidly supports the tubular shaft housing during normal vehicle operation, thereby precluding any undesired vibratory motion of the shaft support system.

Further features of the invention will be apparent from the attached drawings and description of an illustrative embodiment of the invention.

DESCRIPTION OF A PREFERRED EMBODIMENT OF THE INVENTION

Figure 1:
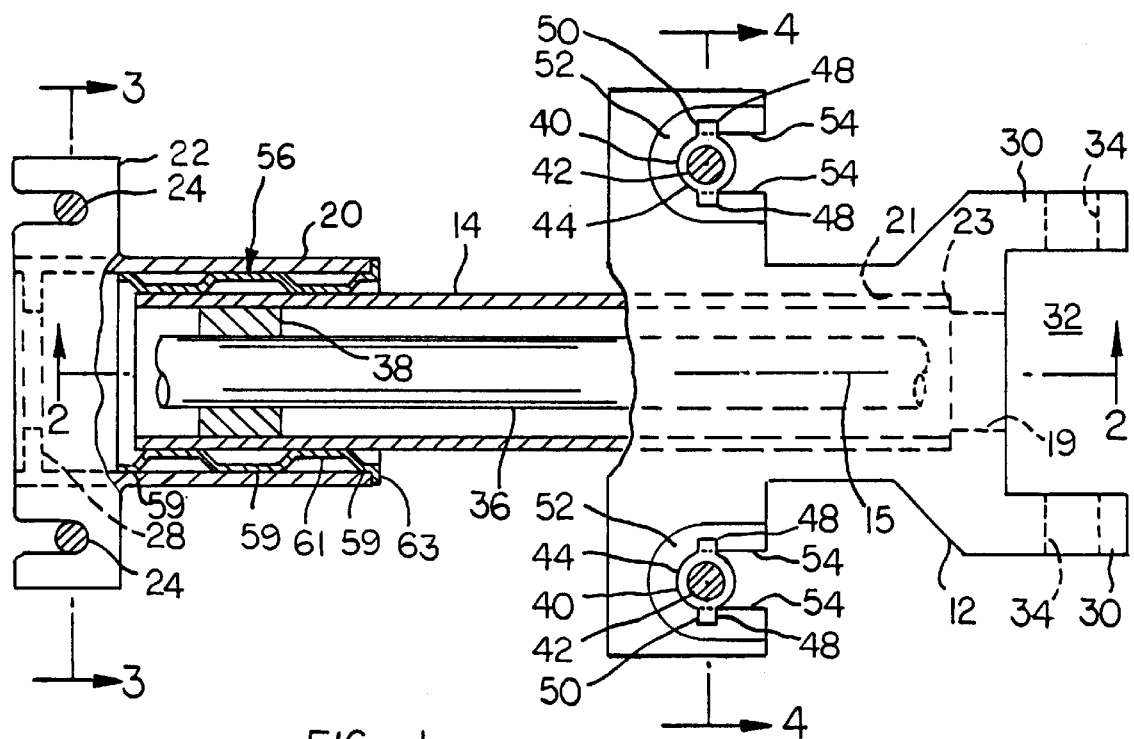
FIG. 1 is a plan view of an illustrative embodiment of the invention, with fragmentary portions thereof shown in section along line 1—1 in FIG. 2.

The drawings show an energy-support system for a vehicle steering mechanism. The vehicle steering mechanism includes a rotary shaft 36 extending angularly downwardly within an upper shaft housing member 12 and a lower tubular shaft housing 14. Members 12 and 14 form a shaft housing assembly.

Shaft housing member 12 is a rigid one-piece member, preferably formed as a magnesium die casting, in order to achieve a light weight rigid structural component. Housing member 12 is supported by an overhead mounting bracket 16 that is affixed to the vehicle interior frame by two or more bolts 18 (shown in FIG. 4). Bracket 16 can be a steel stamping.

Shaft housing member 12 has a circular bore 19 that communicates with a somewhat larger bore 21 to form an annular shoulder 23 concentric around a longitudinal axis 15. Bore 21 forms an elongated socket for the lower tubular housing 14. Housing 14 is preferably formed out of high strength steel, so as to become a relatively rigid part of the shaft housing assembly when the tubular housing 14 is welded, or otherwise joined to housing member 12. The rigidness of the shaft housing assembly is enhanced by the relatively long length of bore 22 in housing member 12.

Figure 2:
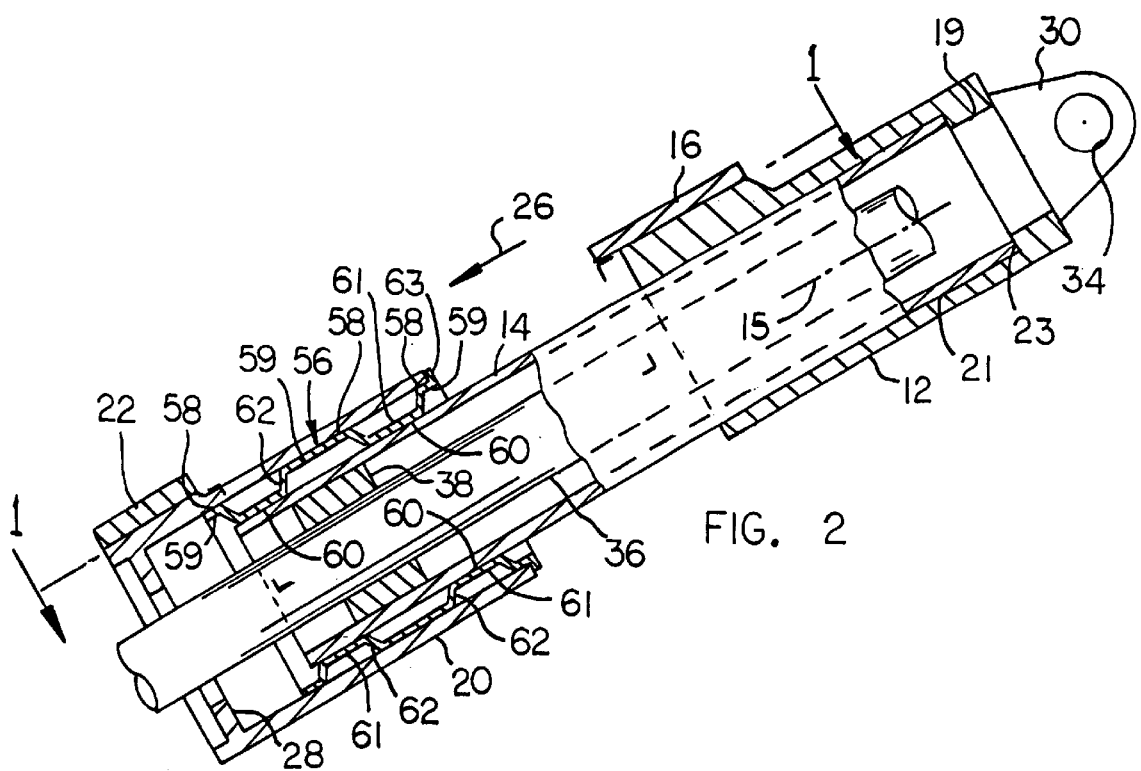
FIG. 2 is a longitudinal sectional view taken on line 2—2 in FIG. 1.
Figure 3:
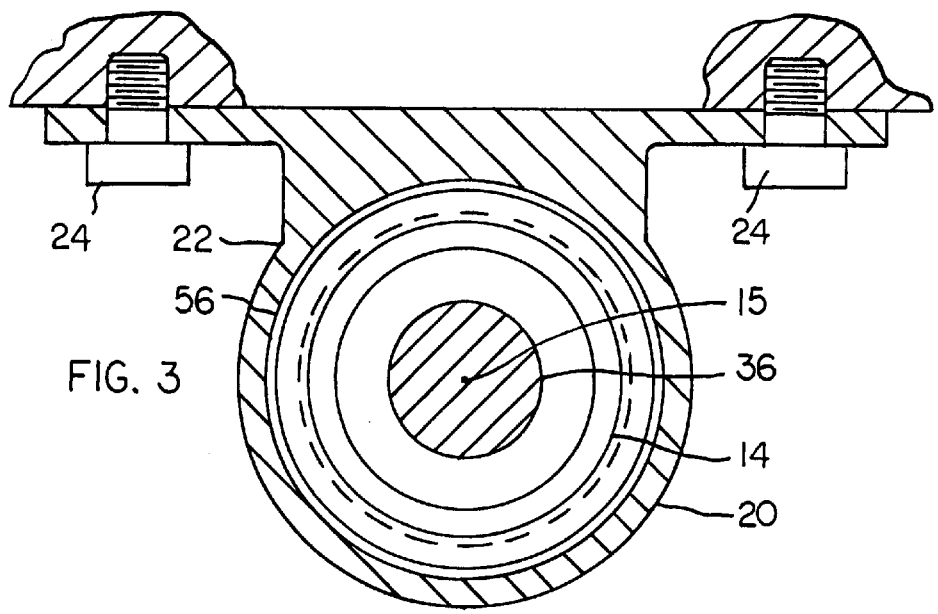
FIG. 3 is a transverse sectional view taken on line 3—3 in FIG. 1.

As shown in FIGS. 1 and 2, the lower end of tubular shaft housing 14 extends into a tubular casing 20 that is an integral part of a lower mounting bracket 22. As shown in FIG. 3, bracket 22 is rigidly affixed to the vehicle interior frame by two bolts 24. Bracket 22 can be a one piece magnesium die casting, for achievement of lightness and rigidity.

In a frontal crash event, brackets 16 and 22 remain firmly attached to the vehicle interior frame. The shaft housing assembly (comprised of housing members 12 and 14) has limited downward motion along longitudinal axis 15, as denoted by arrow 26 in FIG. 2. The downward motion is limited by contact between the lower end of the tubular housing 14 and internal flange 28 in tubular casing 20.

At its upper end, housing member 12 has two integral ears 30 spaced apart by a distance greater than the diameter of tubular housing 14, so that an enlarged space 32 is formed between the two ears. Ears 30 have aligned holes 34 therein designed to receive pivot pins that hingedly connect the shaft housing assembly to the vehicle steering wheel (not shown). The steering shaft 36 extends longitudinally along axis 15 within the shaft housing assembly. The upper end of shaft 36 is connected to a universal joint located in space 32, whereby the shaft is operatively connected to the rotary output of the steering wheel. A shaft bearing 38 can be located in the lower end of tubular housing 14 in order to provide suitable support for rotary shaft 36.

Upper housing member 12 is fastened to mounting bracket 16 by two similarly constructed releasable fastener assemblies 40 located equidistant from longitudinal axis 15. In a frontal crash situation wherein an impact force is delivered to the steering wheel, the impact force acts in shear against the fastener assemblies 40 to sever the fasteners and permit the shaft housing assembly to shift angularly downwardly, as indicated by arrow 26 in FIG. 2.

The fastener assemblies 40 are preferably constructed as shown and described in U.S. Pat. No. 5,979,860 issued on November 9, 1999. The present drawings show certain features of the preferred fastener assemblies. A more detailed description of each fastener assembly is contained in U.S. Pat. No. 5,979,860.

Figure 4:
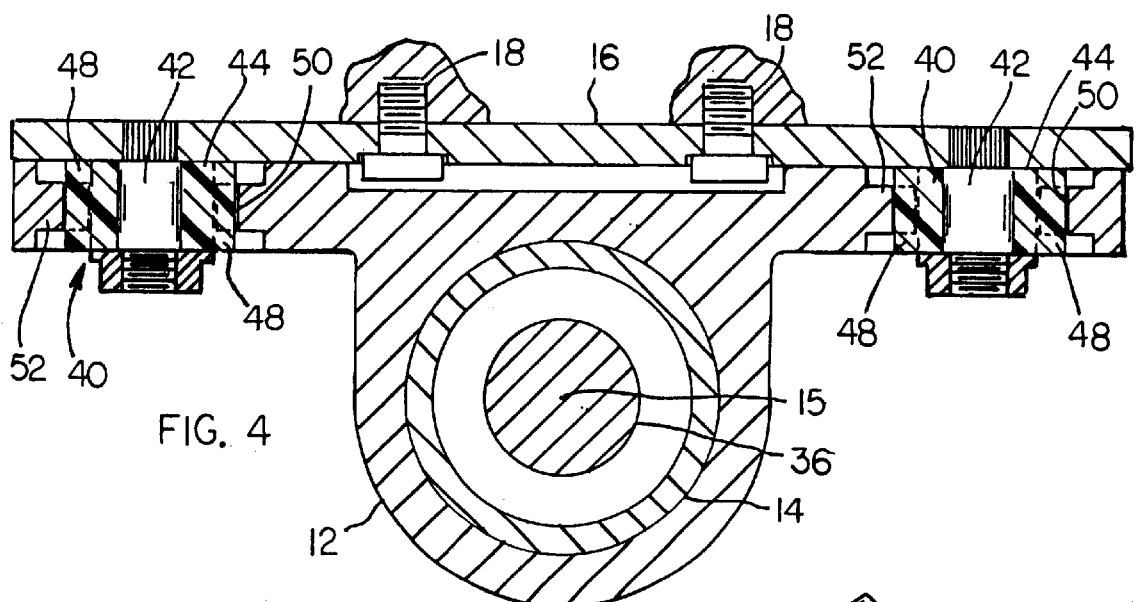
FIG. 4 is a transverse sectional view taken on line 4—4 in FIG. 1.

Referring to FIGS. 1 and 4 herein, each fastener assembly includes a bolt (or pin) 42 suitably secured to mounting bracket 16. A plastic spool 44 encircles the pin in a slot-like space formed within bracket 16. As shown best in FIG. 1, the plastic spool has two ears (or ribs) 48 that extend through mating notches 50 formed in wall 52 of housing 12.

Wall 52 is cut away to form two confronting edges 54 spaced apart by a distance that is equivalent to the diameter of plastic spool 44. During a frontal crash event, sufficient to impart a shock force to the steering wheel, the edge areas of wall 52 in contact with plastic ears 48 exert shear (cutting) forces on the ears, whereby portions of the ears are severed from the plastic spool. The severing action releases the shaft housing assembly for movement in the arrow 26 direction. The two fastener assemblies operate in unison to normally fasten housing member 12 to bracket 16. During a frontal crash event both fastener assemblies undergo the ear-severing action.

Figure 5:
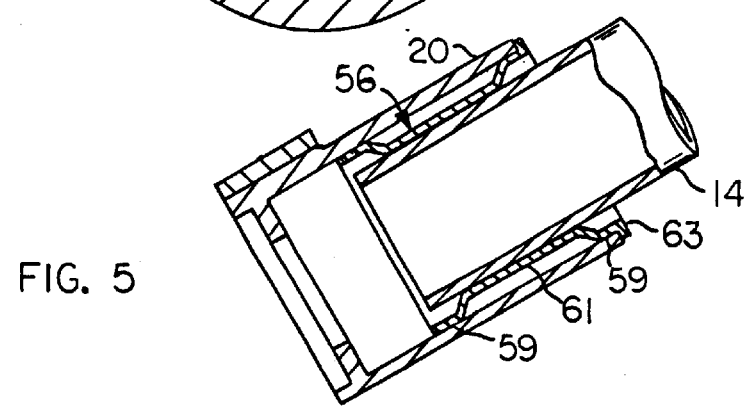
FIG. 5 is a fragmentary sectional view taken in the same direction as FIG. 2, but showing an alternative friction ring that can be used in practice of the invention.

In order to control the velocity of the shaft housing assembly in the arrow 26 direction, there is provided a friction ring 56 at the lower end of tubular housing 14. FIG. 2 shows one form that the friction ring can take. FIG. 5 shows an alternate friction ring that can be used in practice of the invention.

As shown in FIG. 2, the friction ring 56 has three annular surfaces 58 in pressure contact with the inner surface of tubular casing 20, and two annular surfaces 60 in pressure contact with the outer surface of tubular shaft housing 14.

Annular surfaces 58 are defined by axially spaced sections 59 of the friction ring. Annular surfaces 60 are defined by interviewing annular section 61. Annular connection walls 62 join annular sections 59 to annular sections 61. The uppermost annular section 59 is turned radially outward to form an annular flange 63.

Friction ring 56 has a press fit in tubular casing 20, whereby the inner annular surfaces 60 on the intervening ring sections 61 have a diameter that is slightly less than the outer diameter of tubular shaft housing 14. When housing 14 is inserted into tubular casing 20 the surfaces of ring sections 61 exert a strong frictional gripping force on tubular shaft housing 14.

Flange 63 on the friction ring limits downward insertional movement of the ring into casing 20 and otherwise stabilizes the position of the ring during normal vehicle operation, and during a frontal crash event. The stabilized friction ring has continuous three hundred sixty degree contact with the housing 14 outer surface, such that housing 14 has a rigid positionment in casing 20 during normal vehicle operations. Housing 14 is thereby stabilized against any undesired transverse vibrational motion.

In a frontal crash event. The friction ring 56 controls the velocity of the shaft housing assembly after upper housing member 12 has been released from mounting bracket 16. The snubbing action produced by the friction ring prevents any undesired rebound of the shaft housing assembly from flange 28 (FIG. 2).

FIG. 2 shows one form that the friction ring can take. FIG. 5 shows an alternate friction ring construction that can be used. Either friction ring can be manufactured by a machining operation, or by a hydroforming operation. In a machining process, a thick-walled steel tube is machined on the tube inner surface and on the tube outer surface to produce the desired tube cross section. In a hydroforming operation, a thin wall steel tube having an inner diameter slightly less than the outer diameter of tubular housing 14 is bulged outwardly at selected points along the tube length, by applying hydraulic pressure to selected areas of the tube inner surface.

The friction ring is reinforced against undesired deformation by the tubular casing 20. The rigid casing has a press fit on ring sections 59, whereby the ring is reinforced, or supported, around its entire circumference by casing 20.

The drawings necessarily show one particular form that the invention can take. However, it will be appreciated that some variations in structure and arrangement can be used while still practicing the invention.

What is claimed:

1. An energy-absorbing support system for a vehicle steering mechanism, comprising:

an upper mounting bracket and a lower mounting bracket, said lower mounting bracket comprising a tubular casing;

a steering shaft housing assembly supported conjointly by said mounting brackets, said shaft housing assembly comprising an upper housing member having a longitudinal axis, and a downwardly-extending socket on said axis;

a tubular housing element seated in said socket and extending downwardly from said upper housing member into the casing of said lower mounting bracket, said tubular housing element arranged to accommodate a steering shaft extending downwardly from an attached steering wheel;

releasable fastener means connecting said upper housing member to said upper mounting bracket, the fastener means arranged to release the upper housing member for downward movement in response to a crash event sufficient to impart a shock force to the steering wheel; and an annular friction ring rigidly mounted in said tubular casing and arranged to receive the tubular housing element therein, said friction ring comprising an annular inner surface having an inner diameter arranged relative to an outer diameter of the tubular housing element to exert a frictional gripping force on the tubular housing element sufficient enough to control velocity generated by the shaft housing assembly after release of said fastener means, as well as prevent rebound of the shaft housing assembly.

2. The energy-absorbing support system of claim 1, wherein said upper housing member is of one piece construction.

3. The energy-absorbing support system of claim 1, wherein said upper housing member is a one-piece magnesium die casting.

4. The energy-absorbing support system of claim 1, wherein said releasable fastener means comprises two shearable fasteners located equidistant from said longitudinal axis.

5. The energy-absorbing support system of claim 1, wherein said friction ring comprises two axially spaced outer annular sections seated against said tubular casing, an intervening inner annular section seated against said tubular housing element, and annular connector walls joining said inner section to said outer sections.

6. The energy-absorbing support system of claim 5, wherein said friction ring further includes a radial flange extending outwardly from one of said outer annular sections to engage an upper end surface of said tubular casing, whereby said friction ring is prevented from shifting axially in the tubular casing.

7. The energy-absorbing support system of claim 5, wherein said intervening annular section has continuous three hundred sixty degree contact with said tubular housing element.

* * * * *